United States Patent [19]

Seymour

[11] Patent Number: 5,142,848
[45] Date of Patent: Sep. 1, 1992

[54] LIGHTWEIGHT CONDITIONING ROLL

[75] Inventor: Shaun A. Seymour, New Holland, Pa.

[73] Assignee: Ford New Holland, Inc., New Holland, Pa.

[21] Appl. No.: 716,492

[22] Filed: Jun. 17, 1991

[51] Int. Cl.⁵ .................................. A01D 82/00
[52] U.S. Cl. ............................ 56/1; 56/16.4; 56/DIG. 1
[58] Field of Search .......... 56/1, 16.4, DIG. 1; 100/163 R, 169, 176; 404/122, 124

[56] References Cited

U.S. PATENT DOCUMENTS

| | | | |
|---|---|---|---|
| 2,685,548 | 8/1954 | Drozdowski | 56/DIG. 1 X |
| 3,103,240 | 9/1963 | Minera | 56/DIG. 1 X |
| 3,233,530 | 2/1966 | Brebner | 404/124 |
| 3,460,222 | 8/1969 | Mitchell, Jr. | 100/176 |
| 4,256,034 | 3/1981 | Küsters et al. | 100/176 X |
| 4,841,613 | 6/1989 | Beery et al. | 100/176 X |
| 4,860,528 | 8/1989 | Seymour | 56/16.4 |
| 4,903,463 | 2/1990 | Linde et al. | 56/1 |
| 4,905,459 | 3/1990 | Seymour et al. | 56/1 |

Primary Examiner—George A. Suchfield
Attorney, Agent, or Firm—Larry W. Miller; Frank A. Seemar

[57] ABSTRACT

A conditioning roll for use in an agricultural machine for conditioning crop material includes a hollow inner core and an outer shell bonded to the inner core. The inner core has a plurality of ridges extending generally lengthwise thereof. These ridges form a plurality of generally longitudinal lobes on an exterior surface of the conditioning roll. The inner core is preferably formed of extruded aluminum while the outer shell is preferably formed of a relatively thin layer of polyurethane, resulting in a conditioning roll that is lightweight.

13 Claims, 1 Drawing Sheet

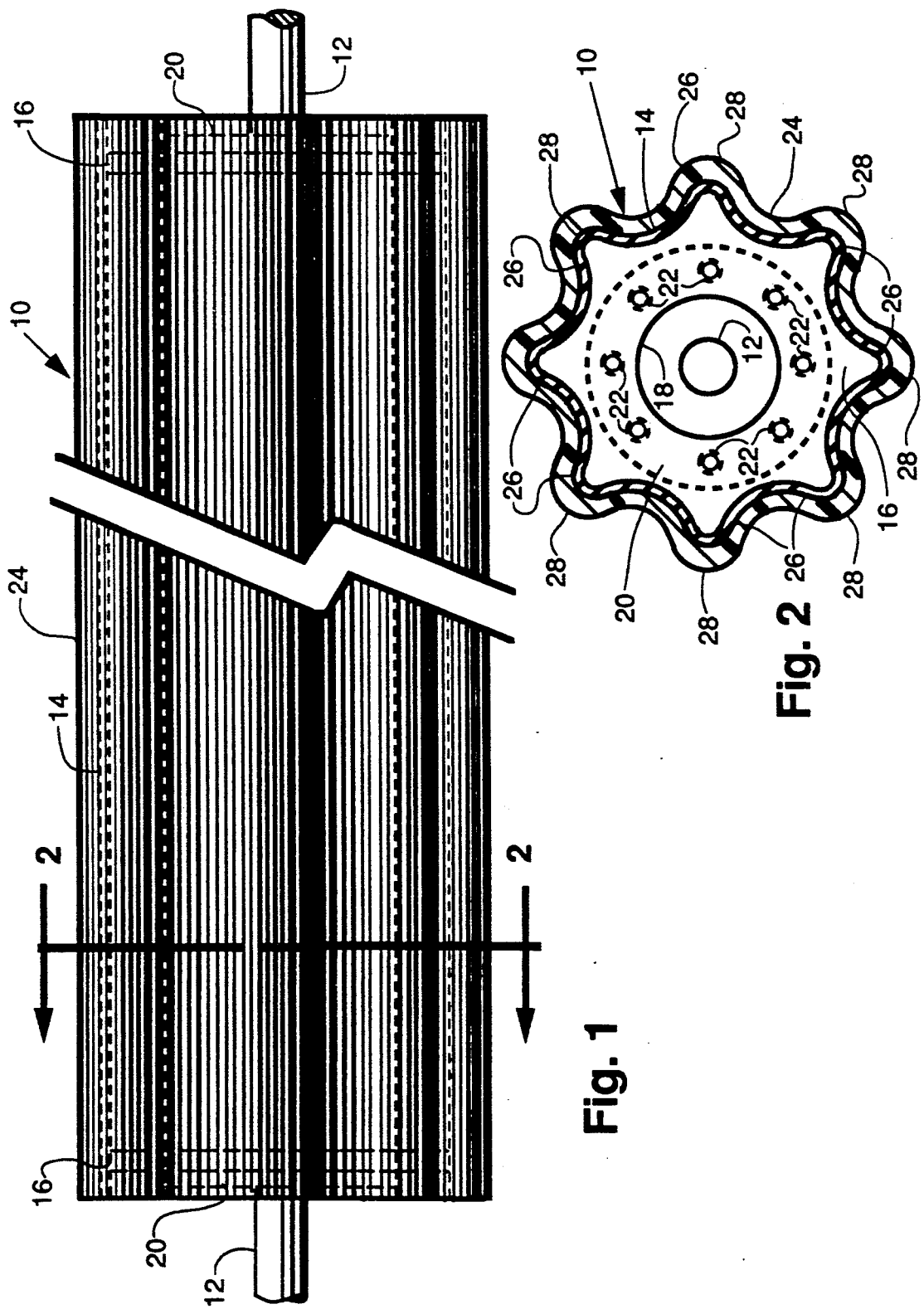

LIGHTWEIGHT CONDITIONING ROLL

BACKGROUND OF THE INVENTION

This invention relates generally to agricultural machines and, in particular, to a machine for conditioning crop material.

U.S. Pat. No. 4,860,528 to S. A. Seymour discloses a conditioning mechanism having a pair of counterrotating rolls which also reciprocate relative to each other. The conditioning rolls are constructed of an outer member formed of rubber and an inner member formed of steel. The outer member is provided with a plurality of lugs or lobes, and the inner member is in the shape of a cylindrical tube. A drawback of the conditioning rolls disclosed in the Seymour patent is that they are too heavy which results in functional problems with the conditioning mechanism.

SUMMARY OF THE INVENTION

It is an object of the present invention to provide a conditioning roll that is lightweight.

Another object of the present invention is to provide a lightweight conditioning roll that is particularly suitable for use in a conditioning mechanism having a pair of counterrotating conditioning rolls which also reciprocate relative to each other.

The present invention is directed to a conditioning roll having an inner core and an outer shell fixed to the inner core. The inner core has a plurality of ridges extending generally lengthwise thereof forming a plurality of generally longitudinal lobes on an exterior surface of the conditioning roll. Preferably, the inner core is formed rigid material such as aluminum while the outer shell is formed of elastomeric material such as polyurethane. Alternatively, the inner core has an interior filled with rigid structural foam material such as polyurethane.

DESCRIPTION OF THE DRAWINGS

FIG. 1 is a front elevational view of a conditioning roll according to the preferred embodiment of the present invention with a portion thereof broken away; and FIG. 2 is a sectional view taken along lines 2—2 in FIG. 1.

DESCRIPTION OF THE PREFERRED EMBODIMENT

Referring to FIGS. 1 and 2, a conditioning roll 10 is supported at its ends by shafts 12 for rotation and reciprocation in the manner described in U.S. Pat. No. 4,860,528 granted Aug. 29, 1989 to S. A. Seymour and incorporated herein by reference. The conditioning roll 10 includes a hollow inner core 14 preferably formed of rigid material such as extruded aluminum A pair of end caps 16 are welded in opposite ends of the inner core 14. A hole 18 is formed in each end cap 16, and a plate 20 is attached by bolts 22 to each end cap 16. The plates 20 support the shafts 12.

The conditioning roll 10 also includes an outer shell 24, preferably formed of a relatively thin layer of elastomeric material such as polyurethane, which is bonded to the inner core 14. The inner core 14 has a plurality of ridges 26 extending generally lengthwise thereof that result in a plurality of generally longitudinal lobes 28 on an exterior surface of the conditioning roll 10.

In an alternative embodiment of the conditioning roll of the present invention (not shown), the thickness of the material forming the inner core 14 is reduced and the interior of the inner core 14 is filled with rigid structural foam material such as polyurethane. This alternative embodiment will result in a conditioning roll which is lighter in weight than the conditioning roll 10 shown in FIGS. 1 and 2.

It will be understood that the conditioning rolls disclosed in the prior Seymour U.S. Pat. No. 4,860,528 are substantially heavier than the conditioning roll 10 of the present invention. This is due to the relatively large amount of steel and rubber used in the conditioning rolls disclosed in the prior Seymour patent. In contrast, the conditioning roll 10 of the present invention includes the inner core 14 which is formed of extruded aluminum and the outer shell 24 which is formed of a relatively thin layer of polyurethane.

Although the conditioning roll 10 shown in FIGS. 1 and 2 has a configuration consisting of eight lobes 28, it will be understood that the present invention is not limited to this configuration. For example, the conditioning roll 10 could have a configuration consisting of any number of the lobes 28.

The present invention thus provides a lightweight conditioning roll that is particularly suitable for use in a conditioning mechanism having a pair of counterrotating conditioning rolls which also reciprocate relative to each other.

What is claimed is:

1. A conditioning roll rotatably mountable in an agricultural machine for use in conditioning crop material, said conditioning roll being rotatable about an axis of rotation, comprising:

a convoluted inner core defining a plurality of ridges extending generally parallel to said axis of rotation and being spaced around a circumferential periphery of said inner core; and an outer shell fixed to the circumferential periphery of said inner core, said outer shell having a generally uniform thickness and defining an axially extending lobe corresponding to each said ridge of said inner core.

2. The conditioning roll of claim 1 wherein said inner core is a hollow member defining an interior cavity.

3. The conditioning roll of claim 2 wherein the interior cavity of said inner core is filled with rigid structural foam material.

4. The conditioning roll of claim 2 wherein said inner core is provided with an end cap affixed to said inner core at each axially spaced and thereof, each said end cap supporting an axially aligned shaft member for rotatably mounting said conditioning roll on said machine.

5. The conditioning roll of claim 4 wherein each said end cap is integrally affixed to said inner core, each said end cap having a plate detachably connected thereto for supporting a corresponding shaft member extending externally therefrom.

6. The conditioning roll of claim 2 wherein said inner core is formed of rigid material and said outer shell is formed of elastomeric material.

7. The conditioning roll of claim 6 wherein said rigid material is aluminum, said elastomeric material is polyurethane and said rigid structural foam material is polyurethane.

8. A conditioning roll for use in an agricultural machine for conditioning crop material, said conditioning roll comprising:

a hollow inner core formed of rigid material, said inner core defining an interior cavity and a plurality of substantially parallel integral ridges extending generally lengthwise thereof and being spaced around the circumferential periphery of said inner core; and an outer shell formed of a layer of elastomeric material having a substantially uniform thickness integrally fixed to the circumferential periphery of said inner core, said outer shell defining a plurality of lobes extending generally lengthwise and corresponding to said ridges, thereby forming a conditioning roll having a convoluted exterior surface.

9. The conditioning roll of claim 8 wherein said inner core is provided with a pair of spaced apart end caps affixed to said inner core proximate to opposing ends thereof, each said end cap supporting a shaft member for rotatably mounting said conditioning roll on said machine.

10. The conditioning roll of claim 9 wherein each said end cap is integrally affixed to said inner core, each said end cap having a plate detachably connected thereto for supporting a corresponding shaft member extending externally therefrom.

11. The conditioning roll of claim 10 wherein said conditioning roll is rotatable about an axis of rotation defined by said shaft members, said ridges and said lobes extending generally parallel to said axis of rotation.

12. The conditioning roll of claim 11 wherein the interior cavity of said inner core is filled with rigid structural foam material.

13. The conditioning roll of claim 12 wherein said rigid material is aluminum, said elastomeric material is polyurethane and said rigid structural foam material is polyurethane.

* * * * *